March 20, 1962 J. R. NOONAN 3,026,483
PLURAL CHANNEL RECORD READ-OUT HAVING MEANS CHANGING PULSE SLICING LEVEL IN ALL CHANNELS IN RESPONSE TO PULSE PRESENCE IN ANY CHANNEL
Filed Dec. 27, 1957 3 Sheets-Sheet 1

INVENTOR
JAMES R. NOONAN
BY P. E. Henninger
ATTORNEY

March 20, 1962 J. R. NOONAN 3,026,483

PLURAL CHANNEL RECORD READ-OUT HAVING MEANS CHANGING PULSE SLICING LEVEL IN ALL CHANNELS IN RESPONSE TO PULSE PRESENCE IN ANY CHANNEL

Filed Dec. 27, 1957 3 Sheets-Sheet 2

March 20, 1962 J. R. NOONAN 3,026,483

PLURAL CHANNEL RECORD READ-OUT HAVING MEANS CHANGING PULSE SLICING LEVEL IN ALL CHANNELS IN RESPONSE TO PULSE PRESENCE IN ANY CHANNEL

Filed Dec. 27, 1957

3 Sheets-Sheet 3

United States Patent Office 3,026,483
Patented Mar. 20, 1962

3,026,483

PLURAL CHANNEL RECORD READ-OUT HAVING MEANS CHANGING PULSE SLICING LEVEL IN ALL CHANNELS IN RESPONSE TO PULSE PRESENCE IN ANY CHANNEL

James R. Noonan, Hyde Park, N.Y., assignor to International Business Machines Corporation, New York, N.Y., a corporation of New York Filed Dec. 27, 1957, Ser. No. 705,603
11 Claims. (Cl. 328—168)

Figure 1:
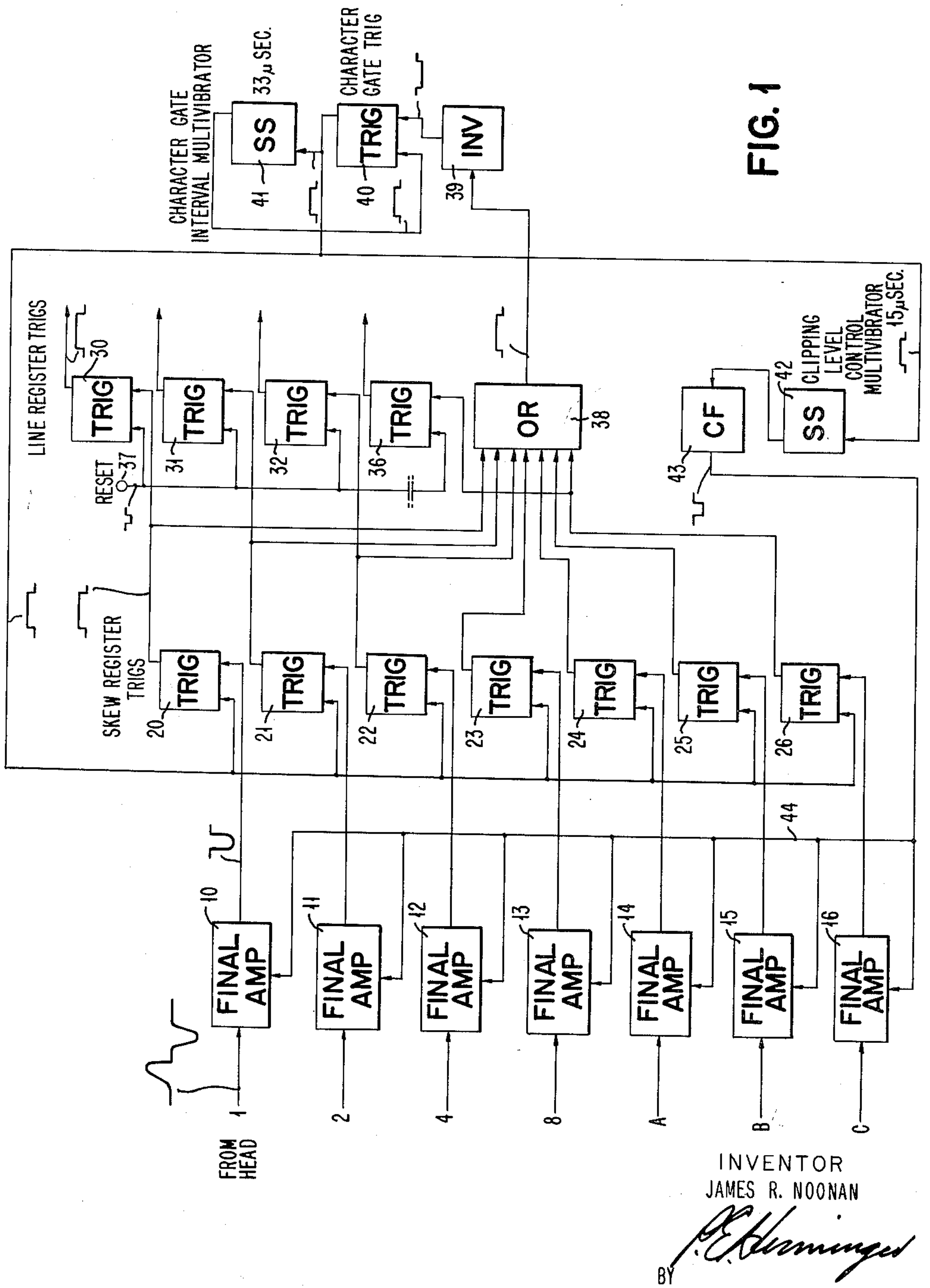

The present invention relates to pulse translating systems and, more particularly, to such systems which provide concurrent amplification and wave shaping of pulses translated thereby. While the invention has utility in numerous diverse applications, it is particularly suited for use in read amplifiers of magnetic recording systems wherein information is recorded as coded groups of pulses.

In using magnetic tape for recording information, it is conventional to record successive information "records" each comprising a number of successively recorded information characters. Each information character is represented by two or more information code "bits" recorded concurrently in parallel recording tracks of the recording medium, and a blank or unrecorded length of the record medium is left between successive information after which the reader drive mechanism is enabled to records. This permits each individual record to be read coast to a stop or otherwise to be halted in the interrecord gap and thereafter to be again brought up to full reading speed before entering the next record. One conventional recording system, relatively widely used because of certain advantages which it possesses, stores each information bit as a change of magnetic field polarity in either direction i.e. (from positive polarity to negative polarity, or vice versa). This is the so-called "non-return to zero" or NRZ form of recording.

When using the latter form of recording it has been found that metallic particles imbedded in the magnetic tape or magnetic "holes" in the tape produce undesirable and disturbing noise pulses. This is because they produce an indicated change of magnetization, and thus develop an output noise pulse somewhat equivalent to that of an information bit although perhaps of shorter pulse duration than the latter. The information pulses read from each recording channel of a magnetic tape are translated through an individual read amplifier to increase the pulse amplitude and improve the pulse waveform, and are then conventionally applied to an individual skew register trigger to turn the latter On. The skew register triggers conventionally have a differentiating type of input circuit so that they are turned On by the rate of change of amplitude of record pulses, and consequently are turned On as readily by noise pulses as by record pulses.

To avoid what has been found in practice to be a somewhat serious problem in connection with the effect of these spurious noise pulses, it has become a usual practice so to operate the read amplifiers as effectively to clip off the base portion of each record pulse and to translate to the skew register triggers only the peak portion of the record pulse. This character of amplifier operation, often referred to as "base clipping" of the pulses, is accomplished by applying a fixed operating bias to each read amplifier. The bias is selected of such value that the input record pulses must reach a preselected relatively large amplitude level before any pulse potential is developed in the output circuit of the amplifier. While this method of amplifier operation may reduce the undesirable effect of low level "surface" noise characteristic of the magnetic tape medium, and may eliminate the lower amplitude noise pulses, the base clipping level selected cannot have too high an amplitude level value since otherwise low level record pulses are also undesirably lost. These low level record pulses result from any of several well known causes and are characterized not only by low pulse amplitude but additionally by a badly degraded pulse wave form often stretched out to have a pulse duration of perhaps fifty microseconds in contrast to the desired high amplitude sharply defined record pulse having a conventional pulse duration of twenty microseconds. The interval at which coded pulses representing an information character occur is conventionally of the order of sixty-five microseconds, so that a pulse of badly stretched and degraded wave form may have a pulse duration almost equal the character interval. There is the further disadvantage with the fixed-bias base-clipping form of read amplifier operation that the use of only the peak portion of the record pulse may impair their effectiveness in turning On the skew register triggers, and thus increase the amount of skew prevailing. This is because the rate of change of amplitude of the translated pulse is reduced and the trigger turn-on control depends upon rate of amplitude change as mentioned above.

Spurious noise pulses are particularly objectionable during the interrecord gap interval. It is conventional to employ parity or redundancy checking arrangements to detect the loss of a character bit or the false insertion of an extra spurious character bit, and these arrangements upon detecting an error ordinarily initiate an automatic operation directed to back spacing of the tape and rereading the record in an attempt to correct the detected error. Ordinarily, this corrective action will effect rereading of the record three times in an attempt to obtain a correct reading. If any of these repeated attempts is successful, the operation continues as programmed; if all are unsuccessful, an indication of error is automatically furnished to the operator. It is in connection with these automatic error detecting arrangements that interrecord gas noise pulses are particularly troublesome. If the noise pulse occurs just after the end of the record and before the machine has stopped within the interrecord gap, the noise pulse becomes a part of the preceding record and causes the error detecting system to reread the record even though the actual record itself was correctly read out. If the noise pulse should be located immediately after the point where the machine stops in the interrecord gap, the next record reading operation in picking up this initial noise pulse may cause the error detecting system to reread the previous record which, of course, will be read as before without error indication and this will effect undesirable duplication of the particular record (an employee might then, for example, erroneously receive duplicate paychecks). If the noise pulse occurs in the interrecord gap at a later point than last mentioned, the error indicating system may cause repeated rereading of the interrecord gap itself with resulting error indication where such indication obviously is not justified. A noise pulse just preceding a record has the same effect as a noise pulse just following a record in that rereading of a record is automatically effected in both instances.

The present invention effects a substantial improvement of the system operation in the presence of noise pulses. The read amplifiers are normally operated with a bias which base clips at a relatively high level of pulse amplitude, for example at a fifty percent level. The first information bit pulse translated by any read amplifier turns On its associated skew trigger and thereby places into operation a control arrangement which in effect substantially reduces the base clipping level of all of the read amplifiers as, for example, to a new clipping level of approximately twenty percent of the normal pulse amplitude. The duration of this newly selected clipping is precisely controlled for an interval selected to have a value of approximately one-quarter character interval after which all of the amplifiers return to their normal high clipping level. This control interval is approximately the full interval of a normal information bit pulse. Lowering the clipping level in this manner has the advantage not only of reducing the response to any noise pulses occurring during the major portion of the character interval, but also of enabling the reading of low amplitude stretched-waveform pulses which might not otherwise be translated by a read amplifier. It also enables the normal high clipping level of the read amplifiers to render the system relatively non-responsive to noise pulses which occur during the interrecord gap, and has the further advantage of substantially reducing the magnitude of any skew appearing between concurrently read information bit pulses representing an information character.

It is an object of the invention to provide a novel pulse translating system having substantially reduced response to undesired spurious noise pulses and thereby greatly enhanced reliability for the translation of desired information pulses.

It is a further object of the invention to provide an improved pulse translating system in which normal operation with reduced sensitivity, premised upon the presence of at least one large amplitude information pulse, is modified during a precisely controlled pulse interval effectively to have substantially increased sensitivity to concurrently appearing low amplitude information pulses.

It is an additional object of the invention to provide a clipping-level-controlled pulse translating system which effectively dynamically reduces the magnitude of skew otherwise appearing between concurrently presented information pulses.

It is yet a further object of the invention to provide in magnetic recording systems a read amplifier arrangement having dynamically controlled pulse clipping levels and thus one exhibiting substantially reduced sensitivity to undesired spurious noise pulses read from magnetic recording media.

Figure 2:
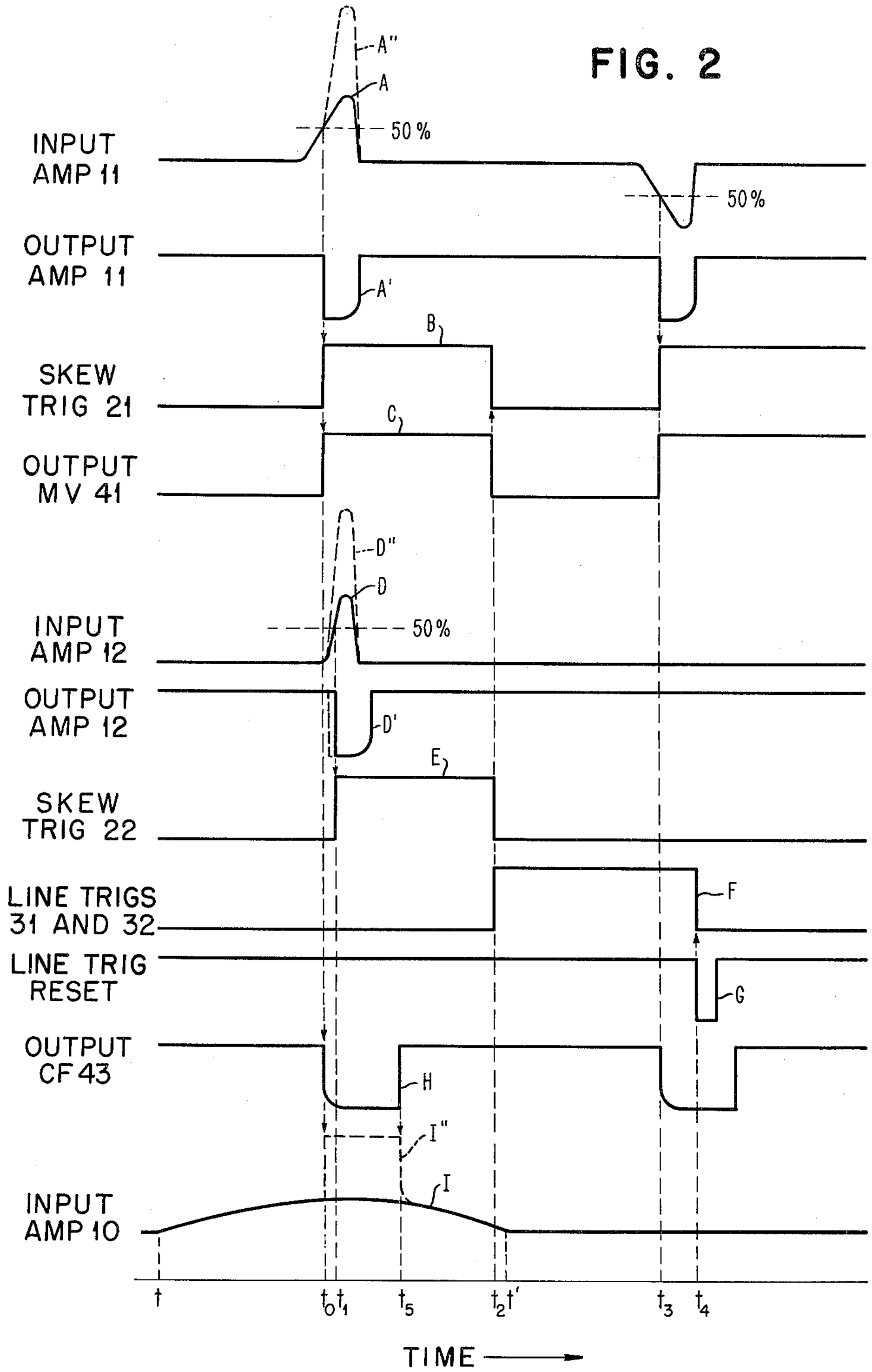
Figures 3, 4:
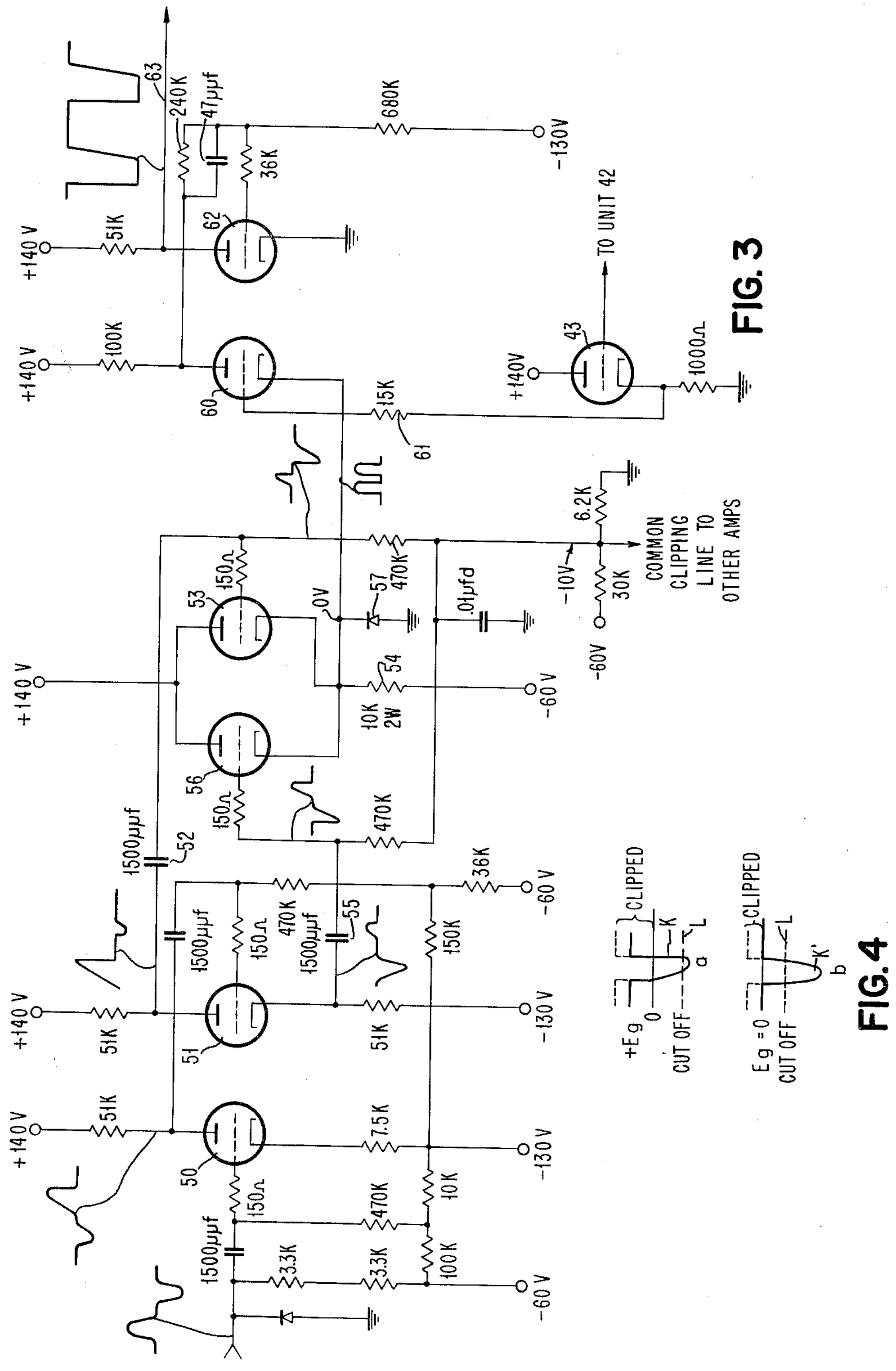

Other objects and advantages of the invention will appears as the detailed description proceeds in the light of the drawings forming a part of this application and in which:

FIG. 1 represents in block diagram form a pulse translating system embodying the present invention;

FIG. 2 graphically represents certain operating voltages appearing in the FIG. 1 system and is used as an aid in explaining its operation;

FIG. 3 is a circuit diagram of a pulse clipping and amplifying arrangement used in the FIG. 1 system, and FIG. 4 graphically represents certain operating potential variations at selected points in the FIG. 3 arrangement and is used as an aid in explaining the operation of the latter.

Referring now more particularly to FIG. 1 of the drawings, a pulse translating system embodying the invention is shown as arranged for use in reading coded information bits representing characters recorded in a magnetic recording system. This system may be one utilizing magnetic recording tape and plural read heads, not shown, for reading information bits recorded in seven channels of the tape. These channels individually store binary-code information bits 1, 2, 4 and 8, zone information bits A and B, and parity or redundancy check bits C as indicated. Such form of recording system is entirely conventional, and each alpha-numeric information character is recorded by conventional code combinations of the binary 1, 2, 4 and 8 and zone A and B information bits. The information bits representative of each such character are concurrently recorded in individual channels of the tape, and a parity or redundancy check bit may or may not be recorded in its individual channel depending upon whether the parity system is selected to be of the even or odd bit type.

One read head, not shown, is provided for each channel of the magnetic record medium and a change of magnetic polarity of the medium occurring in any recording channel produces a current pulse in the read head associated with that channel. The pulses thus developed in the several read heads are applied, after initial or preamplification if desired, to an individual one of a plurality of final read amplifiers 10—16. The latter normally operate with a fixed value of operating bias such that no pulse potential is developed in the output circuit of the amplifier until the applied pulse reaches a preselected amplitude level. The translated pulse is thus effectively base clipped as earlier explained, and those input pulses which have normal maximum amplitude also have the tip portion of the pulse removed or clipped as the pulse is translated by the final amplifier. Thus, the information pulses developed in the output circuit of the final amplifiers have uniform amplitude and improved wave form (i.e. more sharply rising leading edge) if the applied pulse has normal maximum amplitude; applied pulses of less than normal maximum amplitude, if exceeding the base clipping level of the amplifiers, are also translated to the output circuit of the final amplifiers although perhaps not always with uinform pulse magnitude and improved wave form.

Neglecting for the moment the controllable clipping level operation of the final amplifiers 10—16, presently to be explained more fully, the information pulses translated by the final amplifiers are applied as negative-going pulses to individual ones of a plurality of skew register triggers 20—26 where each applied pulse is effective to turn its associated register trigger to the On state of the latter. Each of the triggers 20—26 is a conventional bi-stable form of multivibrator, and includes a differentiating type of input circuit so that it is the rate of change of applied pulse amplitude which is effective to turn the trigger On. Each of these triggers has an output circuit in which the On state of the trigger develops an elevated potential and the Off state of the trigger develops a reduced potential. These output circuits are coupled as shown to the turn-on input circuit of an individual one of a plurality of line register triggers 30—36 of conventional bi-stable construction, arranged to be turned On by a decrease of potential developed in the output circuit of its associated skew register trigger. The line register triggers are all turned Off concurrently by a negative polarity reset potential pulse applied through a reset line 37 to their turn-off input circuits. It is in the output circuits of the triggers 30—36 that information output is developed and from which it is supplied for utilization.

The output circuits of the skew register triggers 20—26 are also coupled through an OR unit 38 and an inverter 39 to the turn-on input circuit of a character gate trigger 40. The latter has an output circuit in which an elevated potential is developed during the On state of the trigger and a reduced potential is developed during the Off state of the trigger. This output circuit is coupled to the turn-on input circuit of a "single shot" or monostable multivibrator 41 of conventional construction and of the type which is turned On by a rise of potential applied to its turn-on input circuit. The single shot multivibrator 41 establishes the character gate interval and has an output circuit in which an elevated potential is developed by its On state and a reduced potential is developed by its Off state. This output circuit is coupled to the turn-off input circuit of the trigger 40 to turn the latter Off upon decrease of potential developed in the output circuit of the unit 41. The component values of the single shot multivibrator 41 are selected in conventional manner to cause this unit when turned On to remain On for an interval corresponding to approximately one-half of the character interval, of the order of thirty-three microseconds by way of example, after which the multivibrator automatically turns itself Off. Thus the multivibrator 41 in its control over the On state of a character gate trigger 40 establishes the character gate interval during which the skew register triggers 20—26 are permitted to remain in their On state. To this end, the output circuit of the trigger 40 is coupled as shown to the turn-off input circuits of all of the skew register triggers 20—26 so that these triggers are all turned Off by turn-off of the trigger 40.

The output circuit of the trigger 40 is also coupled to the turn-on input circuit of a single shot or monostable multivibrator 42, of conventional construction, arranged to be turned On by an increase of potential developed in the output circuit of the trigger 40. The multivibrator 42 has component values so selected in conventional manner that when turned On it remains On for approximately one-quarter of the character interval, of the order of fifteen microseconds by way of example, and then automatically turns Off again. The single shot multivibrator 42 includes an output circuit in which its Off state develops an elevated potential and its On state develops a reduced potential. The value of this elevated potential is selected to be of the order of +4 volts, and the value of the reduced potential is selected to be of the order of −15 volts. The output circuit of the unit 42 is coupled through a conventional cathode follower 43 to a clipping-level control circuit 44 which is common to all of the final amplifiers 10—16 and is effective during the On state of the single shot multivibrator 42 to reduce the base clipping level of these amplifiers. The conventional cathode-circuit resistor of the cathode follower 43 is connected between cathode and ground so that the potential applied to the control circuit 44 does not go below ground potential even though the multivibrator 42 in its On state applies a relatively large negative potential (of the order of −15 volts) to the input circuit of the cathode follower.

Considering now the operation of the pulse translating system just described, and referring to the curves of FIG. 2, assume that a binary-2 information bit pulse is read from an information channel of the magnetic recording tape and is applied to the final amplifier 11 as represented by curve A of FIG. 2. When this pulse reaches a preselected amplitude, which it is here assumed is an amplitude corresponding to fifty percent of the normal maximum amplitude of information pulses read from the magnetic tape, the pulse begins to develop an output potential pulse in the output circuit of the amplifier 11, as represented by curve A′, and this developed output pulse turns On the associated skew register trigger 21 at time $t_0$ as represented by curve B. The output potential of the trigger 21 is translated through the OR unit 38 and inverter 39 to turn On the character gate trigger 40, and the output potential of the latter in turn turns On the character gate interval single shot multivibrator 41 to develop in its output circuit a potential represented by curve C.

Assume further that a binary-4 information bit pulse, represented by curve D, is read from the binary-4 information channel of the magnetic tape and is applied to amplifier 12. Further assume that this applied pulse has a slight amount of skew (occurs slightly later in point of time) with reference the binary-2 pulse applied to the amplifier 11 and represented by curve A. Neglecting for the moment any control over the clipping level of the final amplifiers 10—16 by turn On of the skew register trigger 21, the effect of which will be described hereinafter, the input pulse to the amplifier 12 upon attaining a preselected magnitude (assumed fifty percent of maximum pulse amplitude) develops beginning at time $t_1$ a pulse in the output circuit of the amplifier 12 as represented by curve D′. This pulse is effective to turn On at time $t_1$ the skew register trigger 22, as represented by curve E.

After the multivibrator 41 has been On for a preselected interval, for example, thirty-three microseconds, it turns Off at time $t_2$ (as represented by curve C) and thereby turns Off the character gate trigger 40. The latter in turning Off turns Off the skew register triggers 21 and 22, as represented by curves B and E, and the latter triggers in turning Off turn On their associated line register triggers 31 and 32, as represented by curve F. These triggers are subsequently turned Off at time $t_4$ by a line trigger reset pulse, represented by curve G, applied to the reset line 37.

Consider now the prevailing operation of the pulse translating system in accordance with the present invention. When the character gate trigger 40 is turned On as previously explained in response to the first character code bit pulse to be translated by any of the final amplifiers 10—16, heretofore assumed to be the pulse translated by the amplifier 11 and represented by curve A, the elevated potential developed in the output circuit of the trigger 40 turns On the clipping-level control multivibrator 42 at time $t_0$ to develop a reduced potential in its output circuit as represented by curve H. The multivibrator 42 automatically turns Off again at time $t_5$ to develop in its output circuit a negative going potential pulse. This pulse is translated by the cathode follower 43 and is applied through the clipping-level control circuit 44 to all of the final amplifiers 10—16. This control pulse so controls the final amplifiers as substantially to reduce their base clipping level.

With respect to amplifier 11, this reduced clipping level starting at time $t_0$ has much the same effect as though the input pulse to this amplifier had substantially greater amplitude, as represented by the broken line pulse A″. Thus the effective base clipping level of this amplifier is now so reduced that the amplifier begins to develop an output pulse potential when the input pulse amplitude is only, say, twenty percent of the maximum pulse amplitude rather than fifty percent normally prevailing. With respect to final amplifier 12, the reduced clipping level effected by the control pulse likewise has much the same effect as though the input pulse to this amplifier had substantially increased amplitude as represented by the broken line curve D″. This amplifier accordingly also begins to develop an output potential pulse when the input pulse reaches the reduced clipping level, assumed to be twenty percent of maximum pulse amplitude, as indicated by the broken-line portion of curve D′. As will be evident from inspection of curves A″ and D″, the effect of this control action is to accomplish a substantial decrease in the effective skew of the applied pulses. Thus the output pulses of the amplifiers 11 and 12 are more nearly coincident in point of time, as indicated by comparison of the curve A′ and the broken line portion of curve D′, with resultant more coincident turn On of their associated skew register triggers 21 and 22. Thus, it will be evident that the level control action described effects a substantial reduction in the amount of skew appearing between information bit pulses representative of a character.

More importantly, however, is the effect on a low amplitude pulse of badly degraded wave form such as one represented by curve I of FIG. 2 which it will now be assumed is applied to the input circuit of the final amplifier 10. If the latter amplifier were to operate at a fixed clipping level selected to have sufficiently high value (for example fifty percent) as to effect relative immunity of the system to spurious noise pulses, the low amplitude degraded wave form pulse applied to amplifier 10 would have insufficient amplitude to develop any output pulse in the output circuit of this amplifier. However, when the control pulse is applied through the clipping-level control circuit 44 to the amplifier 10 to reduce its clipping level, this again has the same effect as though the input pulse had (beginning with time $t_0$) a substantially increased amplitude as represented by curve I″. This low level pulse is now able not only to develop an output potential pulse in the output circuit of the amplifier 10, but additionally the leading edge of this output pulse is very substantially sharpened beginning at time $t_0$ so that the output pulse is enabled readily to turn On the skew register trigger 20. Note here again that under what would other wise have been a relatively bad skew situation as between the pulses applied to the amplifiers 11 and 10, the sharpened leading edge of the output pulse of amplifier 10 now effects turn On of the trigger 20 substantially coincident in point of time with turn On of the triggers 21 and 22. Thus, here again it is apparent that the level control action described both reduces the magnitude of skew otherwise prevailing between concurrently read information bit pulses and in addition enables a low amplitude information bit pulse to be translated to turn On a skew register trigger where the pulse might otherwise be lost. At the same time, the normal otherwise prevailing clipping level of the final amplifiers is maintained sufficiently high as to cause the system to have substantially reduced response to spurious noise pulses read from the magnetic recording medium.

This immunity of the pulse translating system to spurious noise pulses is evident when it is considered that the pulse base clipping level of the final amplifiers 10—16 is reduced only during the interval when the clipping level control multivibrator 42 is turned On. This is a relatively short interval, of the order of fifteen microseconds which is only approximately one-quarter of the character interval at which information bit pulses are read from the several channels of the magnetic recording medium. Thus it is only during this relatively short fifteen microsecond interval that low amplitude noise pulses can be translated, and it has been found in practice that this interval is sufficiently short when used in conjunction with a normal amplifier clipping level of approximately fifty percent that the resultant translation by the system of spurious noise pulses is very greatly reduced as compared to operation of the system with a fixed moderately low base clipping level selected to minimize loss of low amplitude information pulses. Note in this regard that except for the short interval when the clipping level of the final amplifiers is reduced as described above, all of the amplifiers normally operate with high base clipping level throughout approximately three-quarters of each character interval and throughout all of the interrecord gap interval of operation. Thus, in effect, this high clipping level prevails at all times except when a first translated information bit pulse signifies that an information character is being read from the magnetic tape medium whereupon the effective sensitivity of the system is substantially increased for approximately the duration of normal amplitude information bit pulses.

The precise manner of control of the clipping level of the final amplifiers 10—16 will be more evident from FIG. 3 which shows the electrical circuit arrangement of each such amplifier. The amplifier includes an initial amplifier stage 50 which receives and amplifies the information pulses read from a given channel of the magnetic recording tape. The amplified pulses developed in the output circuit of the amplifier 50 are applied to a phase splitter 51 which develops in its anode circuit information pulses of one polarity and develops in its cathode circuit the same information pulses but of opposite polarity. The positive polarity information pulses developed in the anode circuit of the phase splitter 51 are applied through a coupling condenser 52 to a cathode follower 53 having a cathode resistor 54 across which the positive polarity pulses are developed. The positive polarity pulses developed in the cathode circuit of the phase splitter 51 are applied through a coupling condenser 55 to a cathode follower 56 which utilizes the same cathode resistor 54. Thus both positive and negative polarity information bit pulses applied to the amplifier 50 appear as positive pulses in the cathode circuit of the cathode followers 53 and 56.

The cathode circuit of the cathode followers 53 and 56 is normally held by a diode 57 at a minimum potential corresponding to ground potential, and the control electrodes of the cathode followers 53 and 56 have applied thereto a fixed negative bias which establishes the minimum value of base clipping level characteristic of the final amplifier. The pulses developed in the cathode circuit of the cathode followers 53 and 56 are applied to the cathode element of what would normally be a grounded grid type of amplifier 60 except for the fact that the control electrode of this amplifier is coupled through a series resistor 61 to the cathode circuit of the cathode follower stage 43 earlier mentioned in connection with the FIG. 1 system. The cathode follower stage 43 is energized by operating potentials of values so selected that the control electrode of the amplifier 60 normally has a positive potential applied to it in the absence of a pulse developed in the cathode circuit of the cathode followers 53 and 56. This positive bias provides a second portion of the base clipping level characteristic of the final amplifier, the overall relatively high value of base clipping level normally prevailing being that provided by the biased states of the cathode followers 53 and 56 and the normal biased state of the amplifier 60.

The output circuit of the amplifier 60 is coupled to the input circuit of an amplifier 62 as shown, and the output circuit of the latter provides the final amplifier output circuit 63 through which translated pulses are applied to an associated skew register trigger.

The operation of the FIG. 3 final amplifier will now be considered with reference the curves of FIG. 4. As earlier mentioned, input pulses applied to the final amplifier are translated by the input amplifier 50 and the phase splitter 51 to the cathode follower stages 53 and 56. The control electrodes of these stages have a fixed negative operating bias applied to them. It will be apparent that a positive information bit pulse applied to the cathode follower stage 53, or a positive information bit pulse applied to the cathode follower stage 56, must attain a preselected amplitude level (sufficient to equal the difference between the fixed control electrode negative bias and the anode current cutoff value of bias) before there is any potential pulse developed across the cathode resistor 54. Thus the cathode follower stages 53 and 56 provide a certain amount of base clipping depending upon the selected value of negative bias applied to the control electrodes of these stages.

The potential pulses developed across the cathode resistor 54 are applied to the cathode of the amplifier stage 60, but there is also applied to the control electrode of this stage a normal positive operating bias indicated by the potential $+E_g$ of FIG. 4*a*. The positive polarity of the pulses as applied to the cathode of this stage are equivalent to applying them with negative polarity to the control electrode of this stage, as is well known, so that the pulse potential between control electrode and cathode varies as represented by curve K of FIG. 4*a*. The initial base portion of the input pulse which was clipped by action of the cathode followers 53 and 56 is represented by the broken line portion of curve K. It is evident that the normal positive bias applied to the control electrode of the amplifier stage 60 prevents any output potential pulse from being developed in the anode circuit of this stage until such time as the net control electrode to cathode voltage reaches zero value; thereafter, the potential pulse causes a decrease of anode current and increase of anode voltage until the anode current cutoff level, shown by the broken line curve L, is reached at which time further decreases of the pulse amplitude have no effect on the output circuit potential. It will be evident that the amplifier stage 60 thus may initially operate to add an additional increment of base clipping of the pulse, and that it also clips the peak of the applied pulse by anode current cutoff. Thus, only that portion of the applied pulse between the zero voltage level and the anode current cutoff level L is developed in the output circuit of the amplifier stage 60 and is applied to the amplifier stage 62. The latter effects some additional clipping of the base portion of the pulse in accordance with the value of the negative bias applied to its control electrode in excess of the anode current cutoff bias of this stage.

Now when the cathode follower stage 43 translates a clipping-level-control pulse as earlier described, the pulse reduces the positive bias potential applied to the control electrode of the amplifier stage 60 substantially to zero. The amplifier stage 60 now amplifies all of the base portion of the pulses applied to its cathode, but effects more peak amplitude clipping of the applied pulses as represented by the curve K' of FIG. 4*b*. Under this condition of operation, therefore, only that portion of an input information bit pulse is initially base clipped as determined by the base clipping action of the cathode follower stages 53 and 56. The over-all base clipping level has now been substantially reduced as, for example, to a clipping level of twenty percent of maximum pulse amplitude whereas for a normal positive bias applied to the control electrode of the amplifier stage 60 a base clipping level of fifty percent of maximum pulse amplitude would prevail. At the same time, it will be noted that the magnitude of peak clipping of each input information bit pulse has also been increased so that the wave form of the input pulses is substantially improved particularly in that the leading edge of the pulse is sharpened.

While a specific form of the invention has been described for purposes of illustration, it is contemplated that numerous changes may be made without departing from the spirit of the invention.

I claim:

1. A pulse translating system comprising code-bit pulse uilizing means, amplifying means for receiving groups of concurrently presented electrical code-bit pulses representatives of characters read from a record medium and for normally translating to said utilizing means those portions of the pulses which lie between preselected upper and lower amplitude clipping levels, means responsive to the first pulse translated by said amplifying means to said utilizing means in respect to each group thereof for developing a control effect of preselected duration, and means responsive to each said developed control effect for substantially lowering the amplitude value of said lower clipping level of said amplifying means.

2. A pulse translating system comprising code-bit pulse utilizing means, amplifying means for receiving groups of concurrently presented electrical code-bit pulses representative of characters read from a record medium and for normally translating to said utilizing means those portions of the pulses which lie between preselected upper and lower amplitude clipping levels, means responsive to the first pulse translated by said amplifying means to said utilizing means in respect to each group thereof for developing a control effect of duration corresponding approximately to that of a normal code-bit pulse, and means responsive to each said developed control effect for substantially lowering the amplitude value of said lower clipping level of said amplifying means.

3. A pulse translating system comprising code-bit pulse utilizing means, amplifying means for receiving groups of concurrently presented electrical code-bit pulses representative of characters read from a record medium and for normally translating to said utilizing means those portions of the pulses which lie between preselected upper and lower amplitude clipping levels of which the lower thereof is selected substantially to reduce the translation of undesired noise pulses read from said medium, means responsive to the first pulse translated by said ampifying means to said utilizing means in respect to each group thereof for developing a control effect of preselected duration, and means responsive to each said developed control effect for effectively lowering substantially the amplitude values of said preselected upper and lower clipping levels of said amplifying means.

4. A pulse translating system comprising code-bit pulse utilizing means, amplifying means for receiving groups of concurrently presented electrical code-bit pulses representative of characters read from a record medium, lower-level clipping means in said amplifying means for normally preventing translation by said amplifying means to said utilizing means of a received pulse until the pulse amplitude exceeds a preselected amplitude level defining a lower pulse clipping level, means responsive to the first pulse translated by said amplifying means to said utilizing means in respect to each group thereof for developing a control effect of preselected duration, and means responsive to each said developed control effect for so controlling said clipping means for the duration of said control effect as substantially to lower the value of said amplitude level at which pulse clipping is effected thereby.

5. A pulse translating system comprising code-bit pulse utilizing means, amplifying means for receiving groups of concurrently presented electrical code-bit pulses representative of characters read from a record medium and for normally translating to said utilizing means those portions of the pulses which lie between preselected upper and lower amplitude clipping levels, means responsive to the first pulse translated by said amplifying means to said utilizing means in respect to each group thereof for developing a control potential pulse of preselected pulse duration, and means responsive to each said control pulse for dynamically controlling said amplifying means substantially to lower for the control-pulse duration the amplitude value at which said lower-level clipping occurs.

6. A pulse translating system comprising plural code-bit pulse utilizing means, plural amplifiers for receiving from individual ones of plural recording channels of a recording medium groups of concurrently presented electrical code-bit pulses representative of characters read from said medium and for normally amplifying and translating to said utilizing means selected portions of the received pulses in excess of a lower amplitude clipping level, and a control device controlled by the first pulse translated by said amplifying means to said utilizing means in respect to each group thereof and operative concurrently to change for a preselected interval said amplitude clipping levels of said amplifiers from a first amplitude value to a substantially lower amplitude value.

7. A pulse translating system comprising plural amplifiers for receiving from individual ones of plural recording channels of a recording medium groups of concurrently presented electrical code-bit pulses representative of characters read from said medium and for normally amplifying selected portions of the received pulses in excess of a lower amplitude clipping level, plural indicating means individual to each said amplifier and responsive to each pulse translated thereby for providing an output indication of the translated pulse, and a control device controlled in common by all of said indicating means and responsive to the initiation of the first indication by any thereof for concurrently changing during a preselected interval said amplitude clipping levels of said amplifiers from a first amplitude value to a substantially lower amplitude value.

8. A pulse translating system comprising plural amplifiers for receiving from individual ones of plural recording channels of a recording medium groups of concurrently presented electrical code-bit pulses representative of characters read from said medium at character intervals and for normally amplifying selected portions of the received pulses in excess of a lower amplitude clipping level, a skew register trigger coupled to each said amplifier and responsive to each pulse translated thereby for indicating each pulse translation, and a monostable device controlled in common by all said triggers and responsive to the initial pulse translation indication of any thereof within a character interval for concurrently changing during a preselected fraction of a character interval said amplitude clipping levels of said amplifiers from a first amplitude value to a substantially lower amplitude value.

9. A pulse translating system comprising plural amplifiers for receiving from individual ones of plural recording channels of a recording medium groups of concurrently presented electrical code-bit pulses representative of characters read from said medium at character intervals and for normally amplifying selected portions of the received pulses in excess of a lower amplitude clipping level, a skew register trigger coupled to each said amplifier and responsive to each pulse translated thereby for indicating each pulse translation, and a monostable multivibrator operated to the unstable state thereof in response to the first pulse translation indication by any of said triggers within a character interval to generate and apply to all of said amplifiers a bias potential pulse of duration short with relation to said character interval and of amplitude effective concurrently to change said amplitude clipping levels of said amplifiers from a first amplitude value to a substantially lower amplitude value.

10. A pulse translating system comprising code-bit pulse utilizing means, a plurality of amplifiers each including an input circuit and a lower-amplitude-level clipping control circuit and responsive to successive groups of pulses read from plural recording channels of a record medium and applied from each said channel to an individual one of said input circuits for amplifying and translating to said utilizing means a segment of only those applied pulses which have an amplitude exceeding a preselected amplitude level established by an operating bias potential applied to said control circuit, and a bias potential control device coupled to all of said control circuits and responsive to said translated pulses to provide a transient substantial lowering of said amplitude level of said amplifiers for a preselected interval following the translation of the first pulse of each group thereof by any of said amplifiers.

11. A pulse translating system comprising code-bit pulse utilizing means, a plurality of amplifiers each including an input circuit and a lower-amplitude-level clipping control circuit and responsive to successive groups of pulses read from plural recording channels of a record medium and applied from each said channel to an individual one of said input circuits for amplifying and translating to said utilizing means that portion of only those applied pulses which exceed in amplitude a preselected lower amplitude clipping level established by an operating bias potential applied to said control circuit, and a bias potential control device coupled to all of said control circuits and controlled by the first pulse of each group thereof translated by any of said amplifiers to said utilizing means for developing and concurrently applying to said control circuits a transient bias potential change effective during a preselected interval substantially to lower said amplitude clipping levels of said amplifiers.

References Cited in the file of this patent

UNITED STATES PATENTS

| | | |
|---|---|---|
| 2,652,488 | Smeltzer | Sept. 15, 1953 |
| 2,681,989 | Cunniff | June 22, 1954 |
| 2,793,344 | Reynolds | May 21, 1957 |

UNITED STATES PATENT OFFICE
CERTIFICATE OF CORRECTION

Patent No. 3,026,483 March 20, 1962

James R. Noonan

It is hereby certified that error appears in the above numbered patent requiring correction and that the said Letters Patent should read as corrected below.

Column 1, line 29, strike out "coast to a stop or otherwise to be halted in the interrecord" and insert instead -- after which the reader drive mechanism is enabled to --; column 2, line 39, for "gas" read -- gap --; column 3, lines 41 and 42, for "appears" read -- appear --; column 9, lines 34 and 35, for "representatives" read -- representative --.

Signed and sealed this 31st day of July 1962.

(SEAL)
Attest:

ERNEST W. SWIDER
Attesting Officer

DAVID L. LADD
Commissioner of Patents